(12) United States Patent
Hendriks et al.

(10) Patent No.: US 7,465,098 B2
(45) Date of Patent: Dec. 16, 2008

(54) SPINDLE MOTOR HAVING VARIABLY GROOVED RADIAL AND THRUST BEARING WITH REDUCED GROOVE ANGLE NEAR BEARING ENTRY

(75) Inventors: Ferdinand Hendriks, Morgan Hill, CA (US); Fu-Ying Huang, San Jose, CA (US); Brian H. Thornton, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 385 days.

(21) Appl. No.: 11/336,078

(22) Filed: Jan. 20, 2006

(65) Prior Publication Data

US 2007/0172161 A1    Jul. 26, 2007

(51) Int. Cl.
*F16C 32/06* (2006.01)
(52) U.S. Cl. .................. 384/114; 384/107; 384/100
(58) Field of Classification Search .................. 384/100, 384/107, 114, 115
See application file for complete search history.

(56) References Cited

U.S. PATENT DOCUMENTS

| | | | | |
|---|---|---|---|---|
| 4,961,122 A | * | 10/1990 | Sakai et al. | 384/114 |
| 5,908,247 A | * | 6/1999 | Leuthold et al. | 384/114 |
| 6,108,909 A | * | 8/2000 | Cheever et al. | 29/898.02 |
| 7,090,401 B2 | * | 8/2006 | Rahman et al. | 384/114 |
| 7,125,170 B2 | * | 10/2006 | Kim | 384/115 |
| 2006/0002640 A1 | * | 1/2006 | Chen et al. | 384/100 |
| 2006/0039637 A1 | * | 2/2006 | Huang | 384/114 |
| 2006/0133703 A1 | * | 6/2006 | Engesser et al. | 384/100 |

* cited by examiner

*Primary Examiner*—Thomas R Hannon

(57) ABSTRACT

A bearing system having variably grooved radial and thrust bearing with reduced groove angle near bearing entry is described. In an embodiment, the bearing system includes a housing. The bearing system also includes a shaft centrally located in the housing. The bearing system additionally includes a rotor portion that is adapted to be rotated about the shaft and contained within the housing. The bearing further includes a variably angled groove disposed on an internal surface of the bearing system. The variably angled groove reduces ingestion of air in the bearing system during operation of the bearing system.

20 Claims, 14 Drawing Sheets

SPINDLE MOTOR HAVING VARIABLY GROOVED RADIAL AND THRUST BEARING WITH REDUCED GROOVE ANGLE NEAR BEARING ENTRY

TECHNICAL FIELD

The present invention relates to spindle motors having fluid dynamic bearings. More precisely, the present invention relates to a spindle motor having a variably grooved radial and thrust bearing with a reduced groove angle.

BACKGROUND OF THE INVENTION

Hard disk drives are used in almost all computer system operations, and recently even in consumer electronic devices such as digital cameras, video recorders, and audio (MP3) players. In fact, most computing systems are not operational without some type of hard disk drive to store the most basic computing information such as the boot operation, the operating system, the applications, and the like. In general, the hard disk drive is a device which may or may not be removable, but without which the computing system will generally not operate. However, some computer systems exist in which the hard drive function is performed by compact flash memory.

The basic hard disk drive model was established approximately 50 years ago. The hard drive model includes a plurality of storage disks or hard disks vertically aligned about a central core that can spin at a wide range of standard rotational speeds depending on the computing application in which the hard disk drive is being used. Commonly, the central core is comprised, in part, of a spindle motor for providing rotation of the hard disks at a defined rotational speed. A plurality of magnetic read/write transducer heads, commonly one read/write transducer head per surface of a disk, where a head reads data from and writes data to a surface of a disk, are mounted on actuator arms.

Data is formatted as written magnetic transitions (information bits) on data tracks evenly spaced at known intervals across the disk. An actuator arm is utilized to reach out over the disk to or from a location on the disk where information is stored. The complete assembly at the extreme of the actuator arm, e.g., the suspension and magnetic read/write transducer head, is known as a head gimbal assembly (HGA).

In operation, pluralities of hard disks are rotated at a set speed via a spindle motor assembly having a central drive hub. Current types of spindle motors include, but are not limited to, various types of bearing systems having a rotating or fixed shaft. Additionally, there are channels or tracks evenly spaced at known intervals across the disks. When a request for a read of a specific portion or track is received, the hard disk drive aligns a head, via the actuator arm, over the specific track location and the head reads the information from the disk. In the same manner, when a request for a write of a specific portion or track is received, the hard disk drive aligns a head, via the actuator arm, over the specific track location and the head writes the information to the disk.

Many of today's hard disk drives, particularly those hard disk drives that are designed to operate at high revolutions, e.g., above 10,000 rpm, include a spindle motor comprising, in part, a fluid dynamic bearing (FDB). An FDB may have a rotating sleeve (fixed shaft) or a rotating shaft (fixed sleeve). It is well known in the art that an FDB provides improved functionality and performance compared with a spindle motor having a ball bearing system.

In particular, it is common for an FDB with a rotating or fixed shaft to be configured with internally disposed grooves that may be configured in, but is not limited to, a herringbone-pattern or a spiral pattern. Grooves (recesses or troughs) and lands (non-recessed areas) are oriented in such an arrangement as to cause pressure between the rotor and stator and it is this pressure that allows the rotor to spin in a stable manner around the shaft, ideally without contact between the stator and the rotor. It is also common for the rotor to be symmetrical from top to bottom. As the rotor spins, upon which the grooves may be located, the grooves cause pressurization of the fluid (oil, air, or other substance) inside the FDB. This allows the rotor to spin freely around the fixed shaft. This is similar to being suspended in oil, with no solid contact between the stator and the rotor.

With reference to a herringbone-patterned FDB, it is common for one of the grooves to be longer than the other grooves, referred to as the unbalanced length or portion. The reason for the unbalanced length is to accommodate the oil air interface (OAI), also referred to as the meniscus. A fixed shaft design (FSD) type of a fluid dynamic bearing (FDB) enables the rotor to spin very smoothly around the shaft. A FSD type FSB is commonly, but not always, implemented in high end server or enterprise type hard disk drives, e.g., those hard disk drives having extremely high capacity and fast rotating speeds. These types of hard disk drives are commonly implemented in server farms and hard disk drive farms. It is not uncommon for a hard disk drive configured with a FSD FDB to reach rotating speeds in excess of 15,000 rpm.

Most fixed shaft design fluid dynamic bearings (FSD FDBs) currently available have groove angles that are constant, relative to bearing shaft perpendicularity. It is well known in the art that the groove angle and bearing stiffness are interrelated. Bearing stiffness within an FDB describes the tendency/ability of the bearing to restore itself, e.g., correct itself relative to a force applied. This is commonly referred to as radial stiffness. Radial stiffness correlates to bearing groove angle. As the groove angle is decreased, bearing stiffness is reduced and when the groove angle is increased, radial stiffness increases. It is also well knows that a groove angle of approximately twenty degrees provides maximum stiffness without detrimentally affecting FDB operation. It is noted that when the groove angle exceeds twenty degrees, the stiffness decreases. It is also well known that a groove angle of less than five degrees will render most FDBs inoperable.

It is well known that when there is an oil and air interface, there is surface tension between the two substances. It is this surface tension that stabilizes the oil in the bearing. When the oil air interface (OAI) is located among grooves, the interface may deform such that it is drawn into the grooves. This is problematic because this is where the danger of air ingestion can occur. With reference to the oil air interface (OAI), the OAI is substantially horizontal when the bearing is not in operation, relative to the vertical axis of the FDB. During FDB operation, the OAI exhibits a wobbly or wave-like shape, similar to a sinusoidal waveform, such that the OAI rises and falls within the bearing system. As the motor is spinning, the oil is drawn into the grooves and pushed outward over the lands. Further, as the speed of the motor increases, the wave-like phenomenon of the OAI becomes extreme, such that the surface of the OAI can form cusps, as shown in prior art FIGS. 8, 9, 10 and 11.

FIG. 7 is an isometric view of the fluid/liquid 10 in a typical FDB, if one could make rigid the fluid and remove all the metal parts there from. FDB fluid 10 shows a spiral pattern 8 that is representative of grooves that would be disposed upon a surface of the thrust bearing of an FDB. FDB liquid 10 also shows a herringbone pattern 9 that is representative of grooves that would be located on a journal or radial surface of the shaft of the FDB. Also shown in FDB fluid 10 is an oil air interface (OAI) 7. OAI 7 is located near the opening of an FDB when the FDB is idle, and the OAI migrates into the herringbone groove pattern during operation of the FDB. It is noted that the groove angles are constant with the exception of the rounding near the apex of herringbone pattern 9.

FIG. 8 shows a line 11 representing an oil air interface in which a bearing system is at rest. FIG. 9 shows a line 12 representing an oil air interface in which the bearing system is now rotating. FIG. 9 also includes a cusp 22 that is formed as the fluid is drawn into a groove within the bearing system as the rotational speed of the rotor increases. FIG. 10 includes a line 13 representing an oil air interface in which the bearing system is rotating faster than the bearing system shown in FIG. 9. FIG. 10 also includes a cusp 23, formed by the fluid being drawn into a groove in which cusp 23 is deeper and sharper than cusp 22 of FIG. 9. The cusp increase is caused by the increased rotational speed of the rotor within the bearing system. It is well knows that increased rotational speeds can cause the OAI to become very sharp, such that it can draw air into the liquid. FIG. 11 illustrates such an occurrence. FIG. 11 includes a line 14 representing an oil air interface in which the bearing system is rotating faster than that shown in FIG. 10. FIG. 11 also includes a cusp 24, formed by the fluid being drawn into a groove, in which the cusp is deeper and sharper that cusp 24 of FIG. 9. FIG. 11 further includes a plurality of bubbles 34 formed as a result of cusp 24 peaking because of increased rotating speed of the bearing system.

When air is drawn into the liquid, this is very detrimental to the operation and function of the FDB. For the liquid, e.g., oil, to operate properly, the liquid needs to be very incompressible, thus providing high stiffness during operation. Incompressibility refers to the characteristic of the liquid to resist change in volume as a result of a pressure applied thereto. When air bubbles are formed in a liquid, the liquid becomes gummy or mushy, similar to hydraulic brakes when air gets into the brake fluid, such that it is quite difficult to apply firm pressure.

During FDB operation, there is a capillary number that is a key parameter in this type of flow phenomenon, e.g., the formation of a cusp. The capillary number is derived from the viscosity of the liquid times speed with which the grooves pass the stator divided by surface tension. The higher the value of the capillary number, the greater the chance of air ingestion occurring during operation.

Accordingly, many of today's currently available FDBs are prone to the phenomenon of air ingestion. Thus, a need exists for an FDB that can substantially reduce instances of air ingestion occurring during operation.

SUMMARY OF THE INVENTION

Embodiments of the present invention provide such a fluid dynamic bearing that can reduce instances of air ingestion. In an embodiment, a bearing system having variably grooved radial and thrust bearing with reduced groove angle near bearing entry is described. In an embodiment, the bearing system includes a housing. The bearing system also includes a shaft centrally located in the housing. The bearing system additionally includes a rotor portion that is adapted to be rotated about the shaft and contained within the housing. The bearing further includes a variably angled groove disposed on an internal surface of the bearing system. The variably angled groove reduces ingestion of air in the bearing system during operation of the bearing system.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
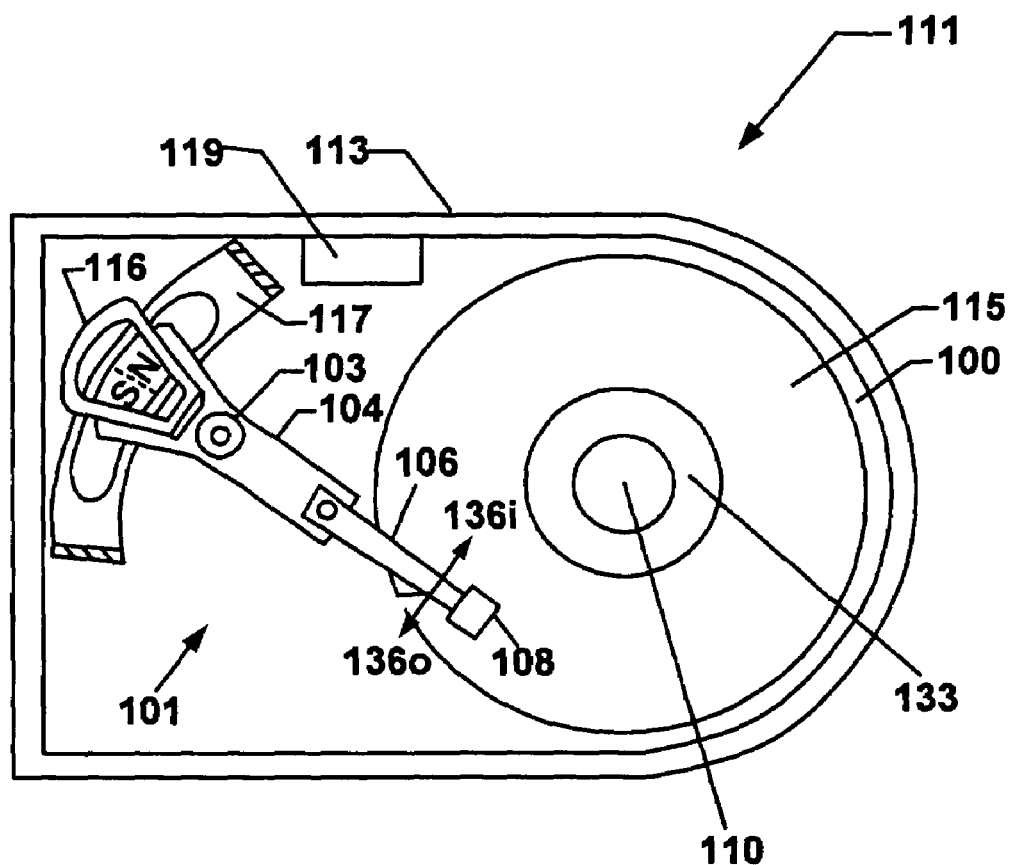
FIG. 1 is a block diagram of a hard disk drive including a spindle motor upon which embodiments of the present invention may be practiced.

A method and system for reducing air ingestion during operation of a fluid dynamic bearing of a hard disk drive is described. In the following description, for purposes of explanation, numerous specific details are set forth in order to provide a thorough understanding of the present invention. It is noted that one skilled in the art will comprehend that the present invention may be practiced without these specific details. In other instances, well-known structures and devices are shown in block diagram form in order to avoid obscuring the present invention.

Some portions of the detailed descriptions, which follow, are presented in terms of procedures, steps, logic blocks, processing, and other symbolic representations of operations that can be performed in the operation of a hard disk drive. These descriptions and representations are the means used by those skilled in the data processing arts to most effectively convey the substance of their work to others skilled in the art. A procedure, executed step, logic block, process, etc., is here, and generally, conceived to be a self-consistent sequence of steps, instructions, or fabrications leading to a desired result. The steps are those requiring physical manipulations of physical entities and/or quantities. Usually, though not necessarily always, these entities take the form of structures, components, and/or circuits utilized in the operation of a hard disk drive.

It should be borne in mind, however, that all of these and similar terms are to be associated with the appropriate physical entities and are merely convenient labels applied to these entities. It is noted that throughout the present invention, discussions are presented that refer to actions and/or processes of a tracing in conjunction with a load beam of a suspension during hard disk drive operation or other such data storage enabling devices.

The present invention is discussed primarily in the context of a high performance hard disk drive, such as those operating near or above 10,000 revolutions per minute. In the present implementation, the high performance hard disk drive described herein and upon which embodiments of the present invention are practiced contains five hard disks and, accordingly, ten read/write heads. Embodiments of the present invention can be readily implemented in conventionally sized high performance hard disk drives, e.g., 3.5 inch, as well as diminutively sized hard disk drives, including those of low profile height. Embodiments of the present invention are well suited to be used with alternative types of hard disk drives including, but which is not limited to, low profile hard drives (e.g., 1.8 inch form factor HDDs), embedded hard disk drives, hard disk drives having a fewer or greater numbers of hard disks and fewer or greater numbers of read/write heads and other data storage devices that have the capability to access a data storage device and upon which data can be stored and/or from which data can be manipulated.

FIG. 1 shows a schematic of a hard disk drive 111 in which embodiments of the present invention can be implemented. Hard disk drive 111 can be a conventionally sized high performance hard disk drive, a low profile high performance hard disk drive such as a 1.8-inch form factor or other high performance hard disk drives. It is particularly noted that embodiments of the present invention are well suited for implementation in most hard disk drives including, but not limited to, conventionally sized (e.g., 3.5 inch) hard disk drives, low profile hard disk drives, miniature hard disk drives, and micro drive hard disk drives. It is further noted that embodiments of the present invention are also well suited for implementation in, but which are not limited to, automotive navigation systems, spindle motors for high-density optical disks and polygon scanner motors.

Hard disk drive 111 includes an outer housing or base 113 containing one (shown) or more magnetic disks 115. Hard disk drive 111 also includes a cover (not shown) for enclosing housing 113. In an implementation, hard disk drive 111 can be configured with five hard disks 115 and ten read/write heads 108. In another implementation, hard disk drive 111 can be configured with three hard disks 115 and five read/write heads 108. Alternatively, hard disk drive 111 may have greater numbers or fewer numbers of hard disks 115, and as such would have greater or fewer numbers of read/write heads 108.

Disks 115 are suitably fixed to a central drive hub assembly 133 of a spindle motor assembly 100 that rotates about a suitable bearing system 110. An actuator 101 includes a plurality of actuator arms 104 (one shown) in the form of a comb that is pivotally mounted above a pivot assembly 103. A controller 119 is also coupled to base 113 for selectively moving the actuator arm 104 relative to disk 115. A spindle motor assembly 100 having a central drive hub 133 rotates magnetic disks 115.

Within spindle motor assembly 100 there is a bearing system 110 containing a shaft and sleeve assembly. In accordance with embodiments of the present invention, bearing system 110 can be a fixed shaft/rotating sleeve shaft design fluid dynamic bearing (FSD FDB) system. In still another embodiment, bearing system 110 can be a rotating shaft/fixed sleeve fluid dynamic bearing (FDB) system.

In the embodiment shown in FIG. 1, actuator arm 104 has extending there from a cantilevered load beam or suspension 106, a magnetic read/write transducer or head 108 mounted on a slider secured to a flexure that is flexibly mounted to each suspension 106. Read/write head 108 magnetically reads data from and magnetically writes data to disk 115. The head gimbal assembly is read/write head and slider 108 mounted on suspension 106. Suspension 106 has a spring like quality for biasing or urging the slider against the disk to enable the creation of air bearing film, or air bearing surface, between the slider and the disk surface. A voice coil 116 housed within a conventional voice coil motor magnet (VCM) assembly 117 (top pole not shown) having a magnet (not shown) is also mounted to actuator arm 104 opposite the head gimbal assembly. Movement of the actuator 101 by controller 119 moves the head gimbal assembly radially across tracks on the disks 115 (inwardly as indicated by arrow 136i and outwardly as indicated by arrow 136o) until heads 108 settle on the target tracks.

Figure 2:
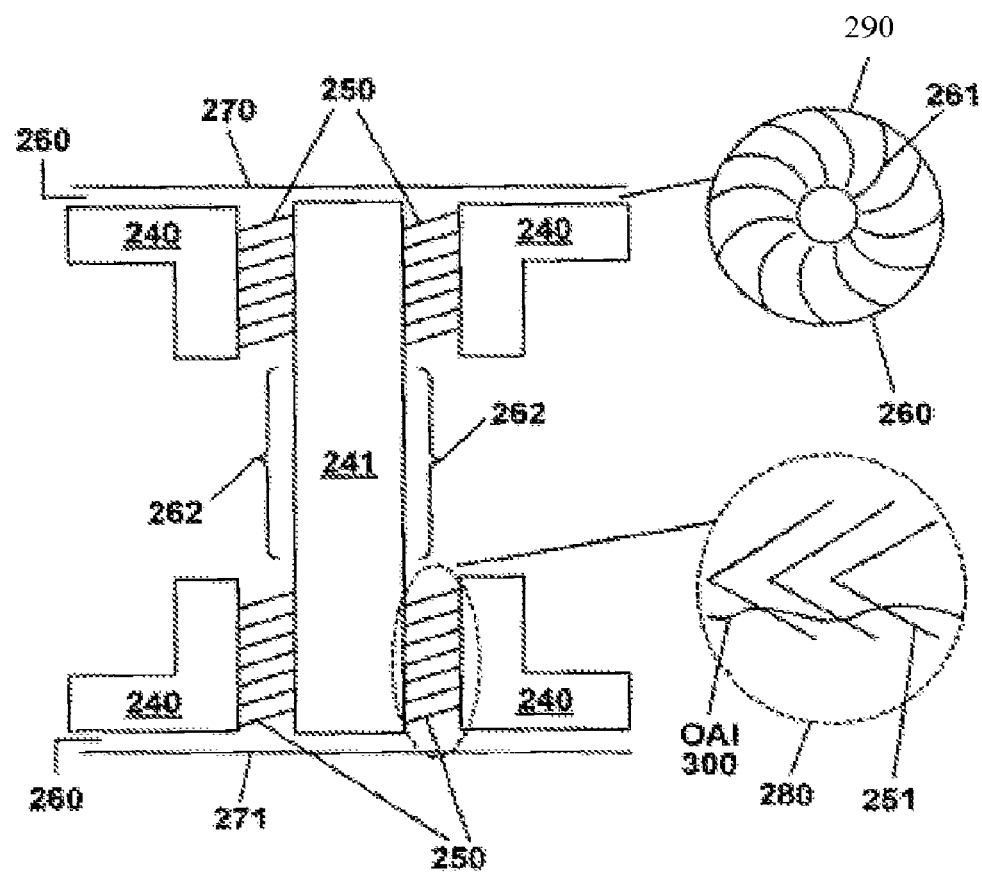
FIG. 2 is a cross section view of a bearing system in a spindle motor implementable in the hard disk drive of FIG. 1 in accordance with embodiments of the present invention.

FIG. 2 is a cross-section block diagram of a bearing system upon which embodiments of the present may be practiced, in accordance with embodiments of the present invention. FIG. 2 shows a fixed shaft design (FSD) fluid dynamic bearing (FDB) 110 having a fixed central shaft 241 around which a rotor 240 rotates. A barrier film 262 is substantially equidistant between opening end 270, located at one end of bearing 110 and an apex 271, located at an opposing end of bearing system 110. Barrier film 262 is provided to resist the flow of the fluid contained therein, so as to prevent the fluid from escaping bearing system 110.

Bearing system 110 also includes a plurality of grooves 250 and 260, in accordance with embodiments of the present invention. Grooves 250 are shown in a cross-section view and grooves 260 are shown in a top view. In an embodiment, grooves 250 are configured in a herringbone pattern 251. Grooves 250 are commonly, but not always, located on journal surfaces of shaft 241. Alternatively, grooves 250 may be disposed on an inner surface of rotor 240. In an embodiment, grooves 260 are configured in a spiral pattern 261. Grooves 260 are commonly, but not always located on the thrust surfaces of bearing system 110. It is noted that although only one set of grooves 260 is shown in detail, there are two individual sets of grooves 260, in which a set of grooves 260 is interposed between opening 270 and rotor 250 of bearing system 110. A second set of grooves 260 is interposed between apex 271 and rotor 250 of bearing system 110.

FIG. 2 also includes an exploded view of grooves 250, shown in dotted circle 280, and grooves 260, shown in solid circle 290. Within circle 280, shown are grooves 250 configured in a herringbone pattern 251, in an embodiment of the present invention. Also shown in circle 280 is OAI 300, indicative of the oil air interface within bearing 110 and represented by a waved line. Within circle 290, shown are grooves 260 appearing as a spiral pattern 261, in another embodiment of the present invention. It is noted that while grooves 250 and 260 are primarily discussed in a herringbone or spiral groove pattern, these patterns are exemplary, and as such should not be construed as a limitation as to their shape or design. It is further noted that circle 290 is representative of the shape of bearing system 110.

Figure 3:
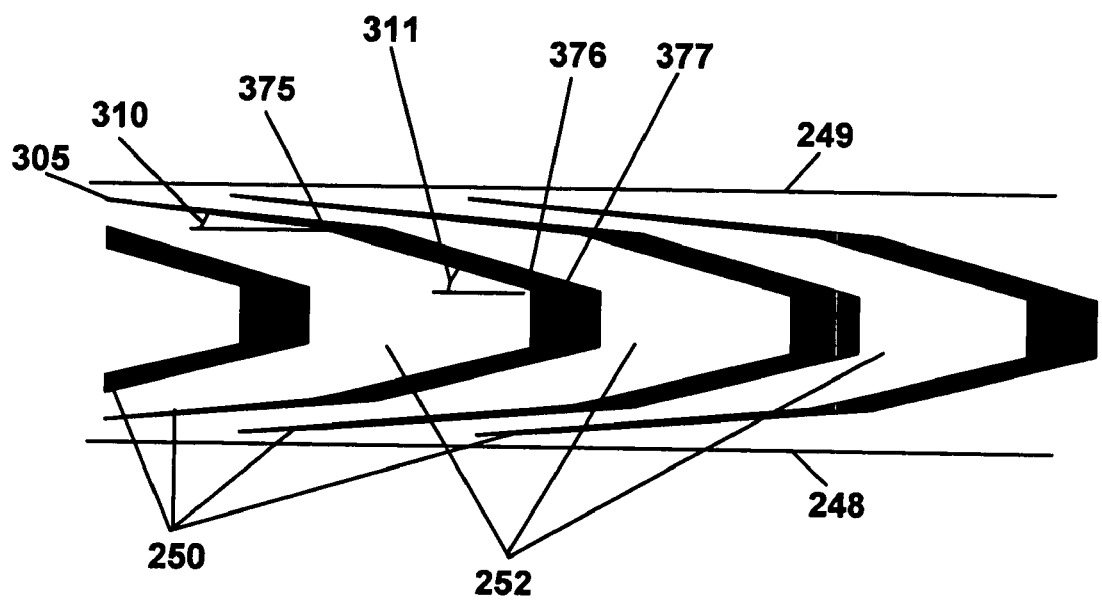
FIG. 3 is an illustration of herringbone-patterned grooves implementable in the bearing system of FIG. 2, in accordance with embodiments of the present invention.

FIG. 3 is a plan view of grooves 250 in a herringbone pattern 251 in accordance with embodiments of the present invention. In an embodiment, grooves 250, shown in herringbone pattern 251, can be configured such that a plurality of groove angles may be implemented in the fabrication of a fixed shaft design fluid dynamic bearing, in accordance with embodiments of the present invention. In an embodiment of the present invention, grooves 250 may be disposed on a surface of shaft 241 of bearing system 110. In an alternative embodiment, grooves may be disposed on a surface of rotor 240 of bearing system 110. Herringbone pattern 251 includes an outer boundary 249 and an inner boundary 248. Herringbone pattern 251 includes a plurality of grooves 250 and lands 252, in accordance with embodiments of the present invention.

Within herringbone pattern 251 of grooves 250, shown are a first and second set of groove angles. First or initial groove angle 310 is located toward an opening 305 of bearing system 110 in which grooves 250 may be implemented. Initial groove angle 310 can be, but is not limited to, approximately five degrees. In an embodiment of the present invention, groove angle is five degrees. In an alternative embodiment, groove angle 310 may range from zero degrees to ten degrees. Groove angle 310 can be constant until reaching a second groove angle, groove angle 311, shown as discreet jump point 375, in accordance with embodiments of the present invention. Groove angle 311 can be, but is not limited to, twenty degrees. Groove angle 311 can be constant until reaching an apex 377 of herringbone pattern 251 in accordance with embodiments of the present invention. In an embodiment, apex 377 can be, but is not limited to, ninety degrees. Alternatively, groove angle 310 can be greater or smaller than five degrees, groove angle 311 can be greater or smaller than twenty degrees, and apex 377 can be greater or smaller than ninety degrees.

It is noted that if the smooth bearing surface is stationary, the grooves would move from right to left. For stationary grooves, the smooth rotor would move from left to right.

Still referring to FIG. 3, it is noted that the width of grooves 250 are narrow at opening 305 and widen at discreet jump point 375 and then widen again at discreet jump point 376. The width of grooves 250 is related to the groove angle of groove 250 dependent upon the point of reference. It is particularly noted that in an embodiment of the present invention, groove angle 310 is five degrees and groove angle 311 is twenty degrees.

Advantageously, by implementing a groove pattern 251 having a variable groove angle, e.g., groove angles 310 and 311, embodiments of the present invention provide, with the initial groove angle, a means for a gradual building of pressure within the bearing system 110, although a groove angle of five degrees does not provide desired rotational support of the bearing system. Therefore, embodiments of the present invention further provide a second groove angle that does provide desired rotational support of the bearing system 110 when under operation. This variable grove angle provides both a reduction in air injection/ingestion and proper rotational stability for the bearing system 110 in which grooves 250 may be implemented.

Figure 4:
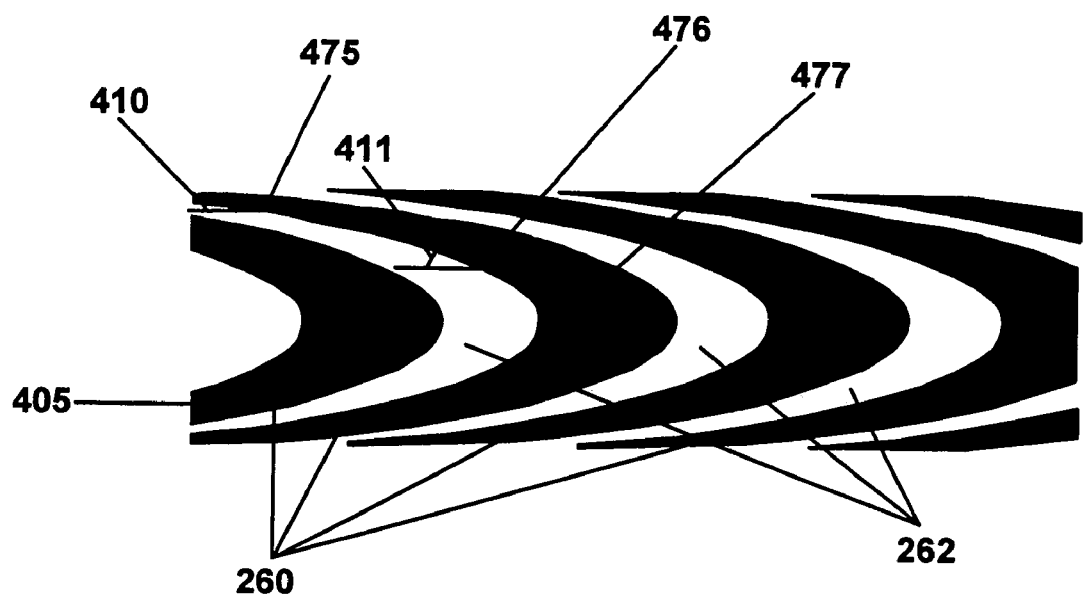
FIG. 4 is an illustration of spiral-patterned grooves implementable in the bearing system of FIG. 2, in accordance with embodiments of the present invention.

FIG. 4 is a plan view of grooves 260 in a spiral pattern 261 in accordance with embodiments of the present invention. In an embodiment, grooves 260, shown in spiral pattern 261, can be configured such that a plurality of groove angles may be implemented in the fabrication of a fixed shaft design fluid dynamic bearing, in accordance with embodiments of the present invention. Spiral pattern 261 includes a plurality of grooves 260, and lands 262, in accordance with embodiments of the present invention. In an embodiment of the present invention, grooves 260 may be disposed on a surface of shaft 241 of bearing system 110. In an alternative embodiment, grooves 260 may be disposed on a surface of rotor 240 of bearing system 110

Within spiral pattern 261 of grooves 260, shown are a first and second set of groove angles. First or initial groove angle 410 is located toward an opening 405 of bearing system 110 in which grooves 260 may be implemented. Initial groove angle 410 can be, but is not limited to, approximately five degrees. Groove angle 410 can be an initial angle, shown at a continuously increasing groove angle jump point 475, and which is continuously increased until reaching a second groove angle, groove angle 411, shown as continuously increasing jump point 476, in accordance with embodiments of the present invention. Groove angle 411 can be, but is not limited to, twenty degrees. Groove angle 411 can be continuously increased until reaching an apex 477 of spiral pattern 261 in accordance with embodiments of the present invention. In an embodiment, apex 477 can be, but is not limited to ninety degrees. Alternatively, groove angle 410 can be greater or smaller than five degrees, groove angle 411 can be greater or smaller than twenty degrees, and apex 477 can be greater or smaller than ninety degrees.

It is noted that if the smooth bearing surface is stationary, the grooves would move from right to left. For stationary grooves, the smooth rotor would move from left to right.

Still referring to FIG. 4, it is noted that the width of grooves 260 is narrow at the opening 405 and widen at jump point 475 and continuously widen until reaching jump point 476. The width of grooves 260 is related to the groove angle of groove 260 dependent upon the point of reference. It is particularly noted that in an embodiment of the present invention, groove angle 410 is approximately five degrees and groove angle 411 is approximately twenty degrees.

Advantageously, by implementing a groove pattern 261 having a variable groove angle, e.g., groove angles 410 and 411, embodiments of the present invention provide with the initial groove angle, a means for a gradual building of pressure within the bearing system 110, although a groove angle of five degrees does not provide desired rotational support of the bearing system. Therefore, embodiments of the present invention further provide a second groove angle that does provide desired rotational support of the bearing system 110 when under operation. This variable groove angle provides both a reduction in air injection/ingestion and proper rotational stability for the bearing system 110 in which grooves 260 may be implemented.

Figure 5:
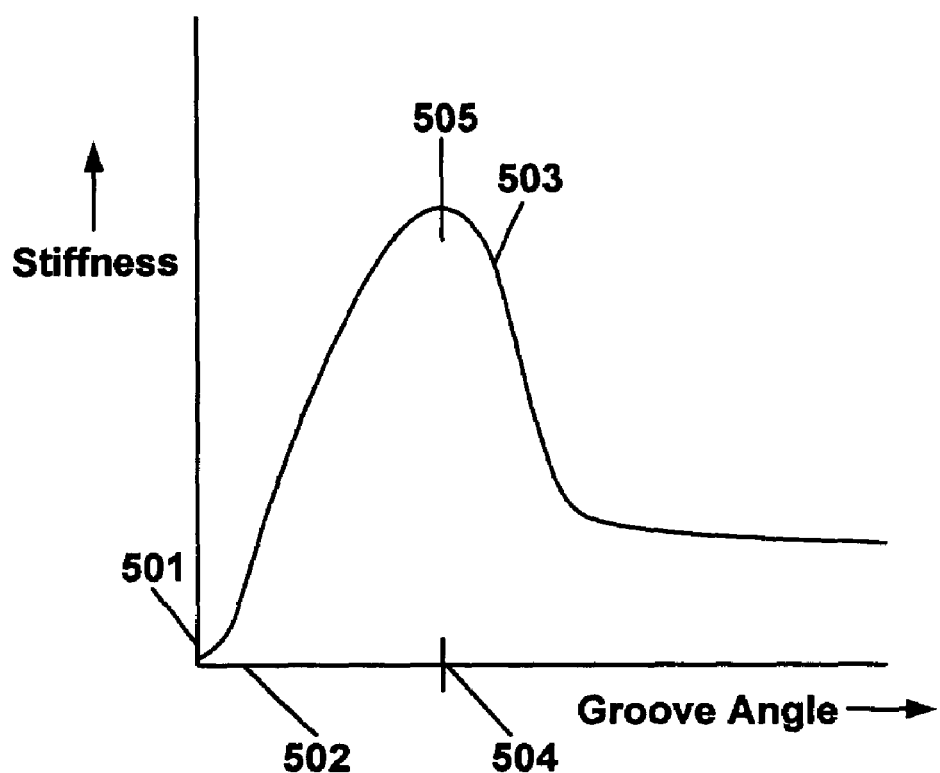
FIG. 5 is a graph illustrating stiffness of a bearing system as it relates to groove angle, in accordance with embodiments of the present invention.

FIG. 5 is a graph depicting stiffness of a bearing system 110 as it relates to the groove angle of the grooves disposed therewithin. Graph 500 is representative of bearing stiffness of a bearing system in which grooves 250 or grooves 260 can be implemented. Graph 500 includes an axis 501 representing stiffness and an axis 502 representing the groove angle. Graph 500 also includes a line 503 representing the stiffness of a bearing system, e.g., bearing system 110, dependent upon the groove angle of a groove, e.g., groove 250 or groove 260 of FIG. 3 or 4, respectively. As shown, line 503 shows that the stiffness of bearing system 110 is at its softest when the groove angle is less than five degrees. As the groove angle increases, the stiffness of the bearing system 110 increases to an optimum stiffness, shown as point 505. It is noted that point 505, indicating optimum stiffness correlates to point 504 on axis line 502. Point 504 represents a groove angle of approximately twenty degrees.

It is noted that a groove angle far exceeding twenty degrees can detrimentally affect the function of a bearing system 110. These detrimental affects can include, but is not limited to, increased friction, increased running torque, increased possibility of bearing seizure, and an increased tendency to draw air into the bearing.

Referring collectively to FIGS. 6A-6D, shown are various profile views of grooves that may be implemented as grooves 250 and/or grooves 260. It is noted that the profile views shown in FIGS. 6A-6D are exemplary in nature and should not be construed as a limitation of the present invention.

Figure 6A:
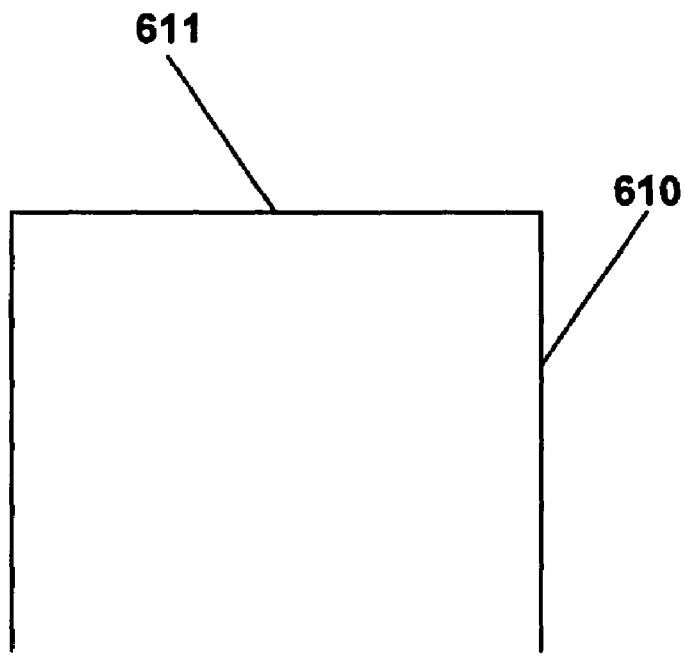
FIG. 6A is a profile of a rectangular groove shape implementable in the bearing system of FIG. 2, in accordance with embodiments of the present invention.

FIG. 6A shows a rectangular shaped groove 610 in which the sidewalls of groove 610 are perpendicular to an apex 611, in accordance with embodiments of the present invention.

Figure 6B:
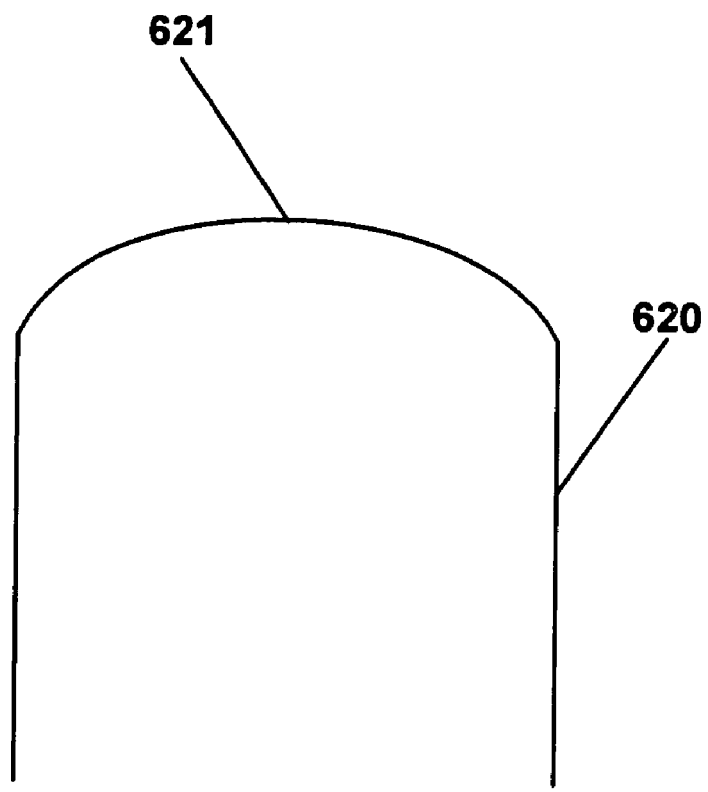
FIG. 6B is a profile of a rounded groove shape implementable in the bearing system of FIG. 2, in accordance with embodiments of the present invention.

FIG. 6B shows a round shaped groove 620 in which the sidewalls are also perpendicular and in which an apex 621 of groove 620 is rounded, similar to an arc, in accordance with embodiments of the present invention.

Figure 6C:
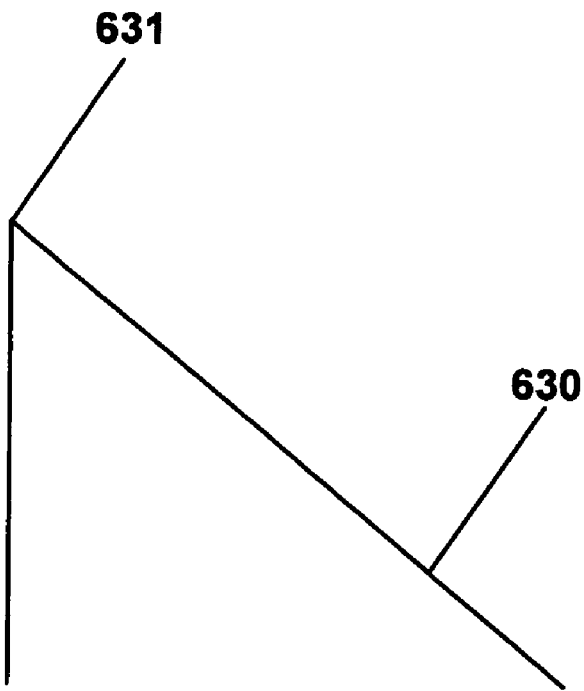
FIG. 6C is a profile of a saw tooth groove shape implementable in the bearing system of FIG. 2, in accordance with embodiments of the present invention.

FIG. 6C shows a saw-tooth shaped groove 630 in which one sidewall is perpendicular and in which the other sidewall is tapered to meet the other sidewall at apex 631, in accordance with embodiments of the present invention.

Figure 6D:
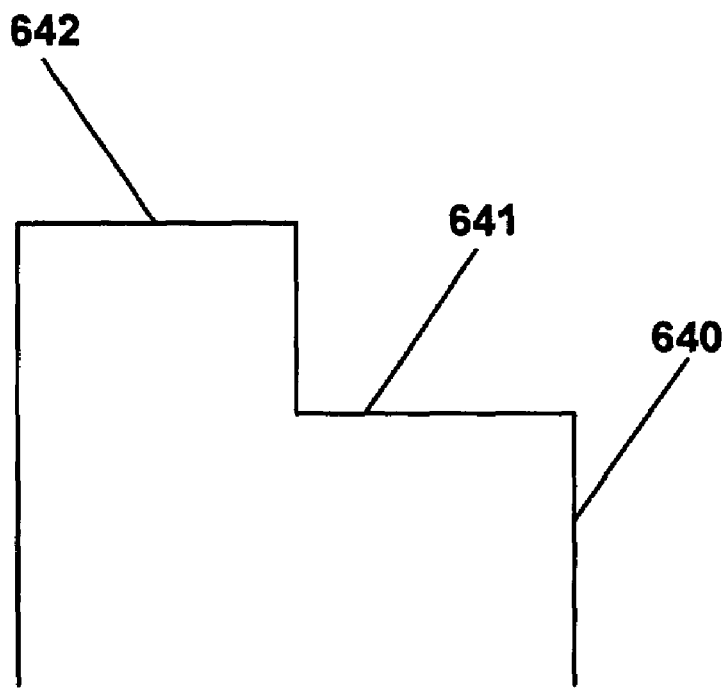
FIG. 6D is a profile of a stepped groove shape implementable in the bearing system of FIG. 2, in accordance with embodiments of the present invention.
Figure 7:
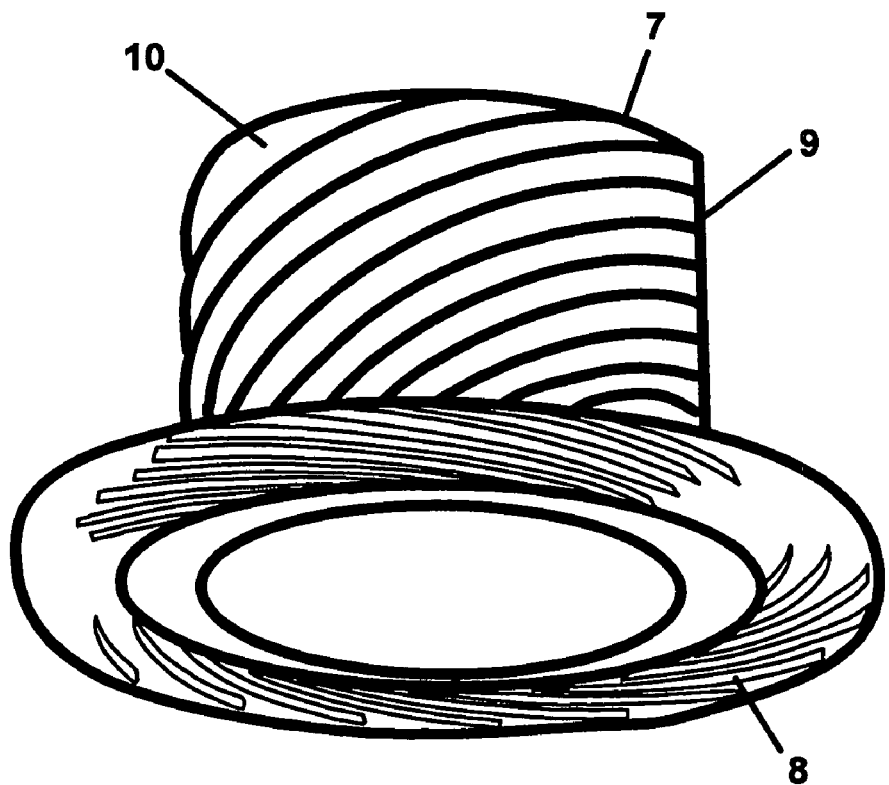
FIG. 7 is an isometric view of the fluid in a conventional fluid dynamic bearing system if all the metal was removed.
Figure 8:
FIG. 8 is an initial sequential illustration of an oil air interface of the fluid dynamic bearing of FIG. 7 in which the bearing system is idle.
Figure 9:
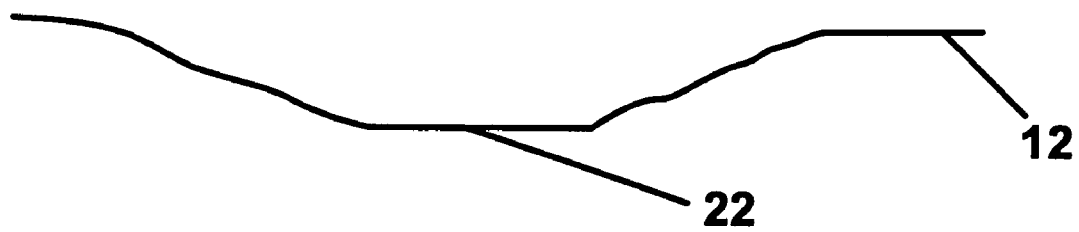
FIG. 9 is a subsequent sequential illustration of the oil air interface of FIG. 8 of the fluid dynamic bearing of FIG. 7 in which the bearing system is rotating and which shows the formation of a cusp.
Figure 10:
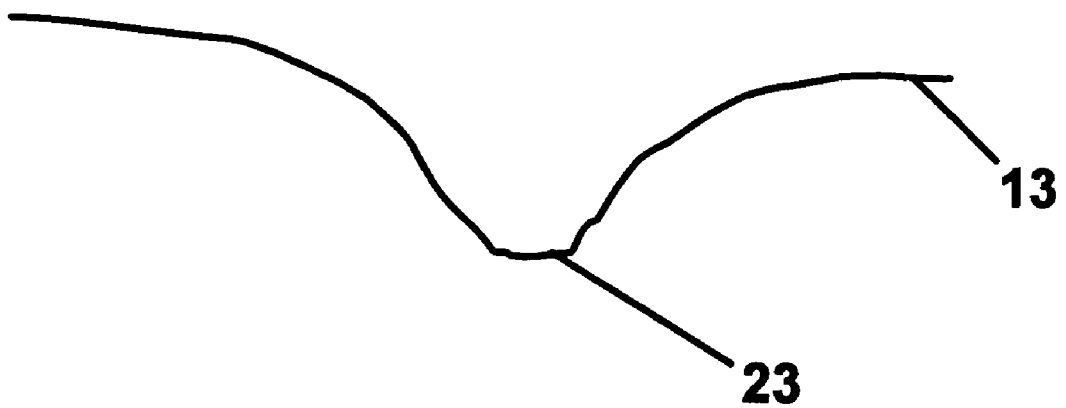
FIG. 10 is a subsequent sequential illustration of the oil air interface of FIG. 9 of the fluid dynamic bearing of FIG. 7 in which the bearing is rotating faster than that shown in FIG. 9, and which shows a more pronounced cusp than in FIG. 9.
Figure 11:
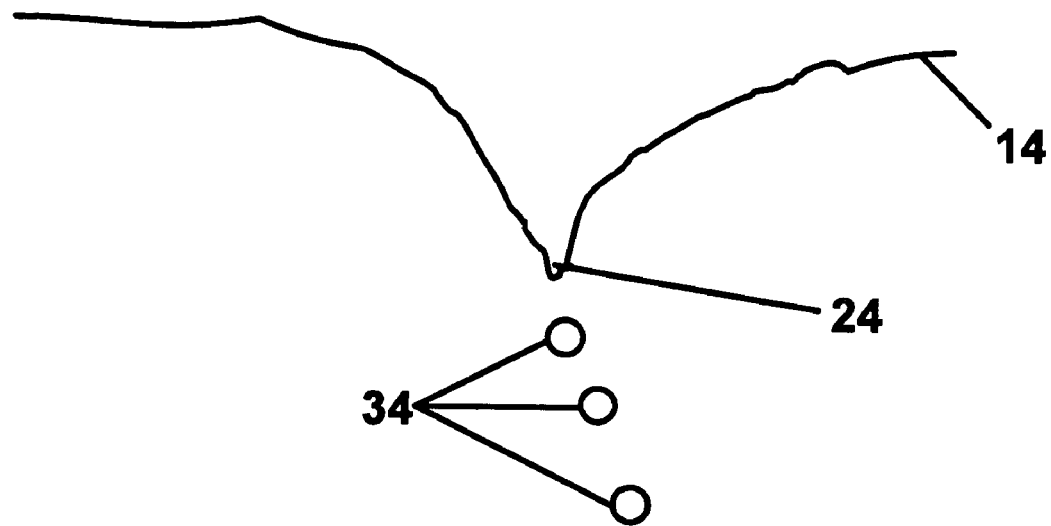
FIG. 11 is a subsequent sequential illustration of the oil air interface FIG. 10 of the fluid dynamic bearing of FIG. 7 in which the bearing is rotating at near maximum speed and which shows a cusp having a peak that can cause the ingestion or injection of air into the fluid.

FIG. 6D shows a step shaped groove 640 in which the sidewalls are perpendicular to a first apex 641 and a second apex 642, in accordance with embodiments of the present invention.

It is noted that groove shapes 610, 620, 630 and/or 640 may each be implemented as grooves 250 and/or grooves 260 in accordance with embodiments of the present invention. It is further noted that many well-known techniques and methods may be implemented in the formation of groove shapes 610, 620, 630 and 640 as grooves 250 or 260. Examples of groove shape formation can include, but is not limited to, reactive ion etching, ion milling, sputtering, coining, ECM (electrochemical machining), ECDM (electrochemical discharge machining), ECAM (electro-chemical arc machining), powder metallurgical processes and sintering processes.

Advantageously, embodiments of the present invention can substantially reduce air ingestion that may occur during operation of the bearing system in a high-performance hard disk drive. Further advantageous is that embodiments of the present invention provide this reduction while maintaining optimum bearing system performance and accordingly hard disk drive performance. Additionally advantageous is that the variable angled grooves described herein and being implemented in, for example, a fluid dynamic bearing in an enterprise type hard disk drive, is readily adaptable for application with alternative types of bearing systems as well as other products using a spindle motor in which a fixed shaft design fluid dynamic bearing in accordance with embodiments of the present invention can be implemented.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A bearing system, said bearing system comprising:
    a housing;
    a shaft centrally located in said housing;
    a rotor portion adapted to be rotated about said shaft and contained within said housing; and
    a variably angled groove disposed on an internal surface of said bearing system, wherein said variably angled groove is tapered.

2. The bearing system as recited in claim 1 further comprising:
    a plurality of grooves wherein each groove in said plurality of grooves is a variably angled groove.

3. The bearing system as recited in claim 2 wherein said variably angled groove further comprises:
    a first groove angle disposed proximal to an inlet of said bearing system; and
    a second groove angle proximal to an apex of said groove.

4. The bearing system as recited in claim 3 wherein said first groove angle is continuously increased until achieving said second groove angle.

5. The bearing system as recited in claim 3 wherein said first groove angle is a constant angle until transforming into said second groove angle.

6. The bearing system as recited in claim 3 wherein said first groove angle ranges from greater than zero to approximately ten degrees.

7. The bearing system as recited in claim 3 wherein said second groove angle is approximately twenty degrees.

8. The bearing system as recited in claim 1 wherein said bearing system is a fluid dynamic bearing system, said fluid dynamic bearing system implementable in a spindle motor.

9. A hard disk drive assembly comprising:
    a base casting providing points of attachment for major components of said hard disk drive;
    a cover attachable to said base casting for encasing said major components; and
    a bearing system coupled with said base casting, said bearing system comprising:
        a shaft attached to said base casting;
        a rotor configured to rotate about said shaft; and
        a variably angled groove disposed on an internal surface of said bearing system,
    wherein said variably angled groove is tapered.

10. The hard disk drive assembly of claim 9 wherein said bearing system further comprises:
    a plurality of grooves wherein each groove in said plurality of grooves is a variably angled groove.

11. The hard disk drive assembly of claim 9 wherein said variable angle groove further comprises:
    a first groove angle disposed proximal to an opening of said bearing system; and
    a second groove angle disposed proximal to an apex of said variably angled groove.

12. The hard disk drive assembly of claim 11 wherein said first groove angle ranges approximately from zero degrees to ten degrees.

13. The hard disk drive assembly of claim 11 wherein said second angle ranges from approximately ten degrees to twenty degrees.

14. The hard disk drive assembly of claim 11 wherein said first groove angle is continuously increased until achieving said second groove angle.

15. A method for reducing air ingestion in a bearing system in a spindle motor, said method comprising:
   defining a first groove angle associated with a plurality of grooves, said first groove angle proximal to an inlet of said bearing system;
   defining a second groove angle associated with said plurality of grooves, said second groove angle proximal to an apex of said bearing system; and
   disposing a plurality of grooves onto internal surfaces of said bearing system, wherein said first groove angle is more acute than said second groove angle, wherein each groove in said plurality of grooves is tapered.

16. The method as recited in claim 15 further comprising:
   altering said first groove angle such that said first groove angle is continuously increased until said second groove angle is achieved.

17. The method as recited in claim 15 further comprising:
   adjusting said first groove angle and said second groove angle such that a definitive point of demarcation from said first groove angle to said second groove angle is present.

18. The method as recited in claim 15 further comprising:
   reducing the width of said plurality of grooves relative to said first groove angle compared with the width of said plurality of grooves relative to said second groove angle.

19. The method as recited in claim 15 wherein said first groove angle comprises a range of degrees from above zero to approximately ten degrees and wherein said second groove angle comprises a range of degrees from approximately five degrees to twenty degrees, said first grove angle and said second groove angle relative to said apex.

20. The method as recited in claim 15 wherein said disposing said variably angled groove is achieved utilizing a metallurgical process combinationally selectable from the group substantially consisting of electrochemical machining, electrochemical discharge machining, electrochemical arc machining, coining, powder metallurgical sintering, sputtering, reactive ion etching and ion milling.

* * * * *